United States Patent
Xiong et al.

(10) Patent No.: US 10,357,882 B2
(45) Date of Patent: Jul. 23, 2019

(54) DATA UPGRADING METHODS AND DEVICES FOR ROBOTS

(71) Applicant: UBTECH Robotics Corp., Shenzhen (CN)

(72) Inventors: Youjun Xiong, Shenzhen (CN); Hailang Zhou, Shenzhen (CN); Musen Zhang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 65 days.

(21) Appl. No.: 15/669,962

(22) Filed: Aug. 7, 2017

(65) Prior Publication Data

US 2018/0186010 A1    Jul. 5, 2018

(30) Foreign Application Priority Data

Dec. 30, 2016   (CN) .......................... 2016 1 1253848

(51) Int. Cl.
| | |
|---|---|
| *G06F 9/44* | (2018.01) |
| *B25J 13/00* | (2006.01) |
| *H04L 12/403* | (2006.01) |
| *H04L 12/40* | (2006.01) |
| *G06F 8/61* | (2018.01) |

(Continued)

(52) U.S. Cl.
CPC .......... *B25J 13/006* (2013.01); *H04L 12/403* (2013.01); *G06F 8/60* (2013.01); *G06F 8/61* (2013.01); *G06F 8/65* (2013.01); *G06F 8/658* (2018.02); *G06F 8/71* (2013.01); *G06F 9/455* (2013.01); *G06F 11/1433* (2013.01);

(Continued)

(58) Field of Classification Search
CPC ..... G06F 8/60; G06F 8/61; G06F 8/65; G06F 8/71; G06F 8/658; G06F 9/455; G06F 11/1433; G06F 11/4411; G06F 16/23; H04L 12/403; H04L 12/4026; H04L 12/40215

See application file for complete search history.

(56) References Cited

U.S. PATENT DOCUMENTS

| | | | |
|---|---|---|---|
| 6,715,001 B1 * | 3/2004 | Birns ...................... | G06F 15/78 709/203 |
| 2006/0253620 A1 * | 11/2006 | Kang .................... | G06F 3/0623 710/36 |

(Continued)

OTHER PUBLICATIONS

Muhammad Inamullah and Bhaskaran Raman, Poster: Frame Aggregation in 802.11ac: Need for Modified Block ACK, ACM, 2018, retrieved online on May 28, 2019, pp. 708-710. Retrieved from the Internet: <URL: http://delivery.acm.org/10.1145/3270000/3267736/p708-inamullah.pdf?>. (Year: 2018).*

(Continued)

*Primary Examiner* — Hanh Thi-Minh Bui (57) ABSTRACT

The present disclosure relates to a data upgrading method, including: transmitting a data region preparation request for preparing a data region, transmitting a length of the upgraded data packet via a block control instruction frame, wherein a node adjusts the data region according to the length of the upgraded data packet, receiving the length of the data region, and transmitting the upgraded data packet according to a predetermined sending sequence. As such, the abnormal operations may be avoided and the reliability may be enhanced.

18 Claims, 3 Drawing Sheets

(51) Int. Cl.
　　　*G06F 8/60*　　　　(2018.01)
　　　*G06F 11/14*　　　 (2006.01)
　　　*G06F 9/455*　　　 (2018.01)
　　　*G06F 8/71*　　　　(2018.01)
　　　*G06F 8/658*　　　 (2018.01)
　　　*G06F 16/23*　　　 (2019.01)
　　　*G06F 8/65*　　　　(2018.01)

(52) U.S. Cl.
　　　CPC ...... *G06F 16/23* (2019.01); *H04L 2012/4026* (2013.01); *H04L 2012/40215* (2013.01)

(56) References Cited

U.S. PATENT DOCUMENTS

2014/0372997 A1* 12/2014 Furushige ............... G06F 8/658
　　　　　　　　　　　　　　　　　　　　　717/168
2016/0380739 A1* 12/2016 Athalye ................... G06F 8/65
　　　　　　　　　　　　　　　　　　　　　370/328

OTHER PUBLICATIONS

Laurent Vanbever et al., HotSwap: Correct and Efficient Controller Upgrades for Software-Defined Networks, ACM, 2013, retrieved online on May 28, 2019, pp. 133-138. Retrieved from the Internet: <URL: http://delivery.acm.org/10.1145/2500000/2491194/p133-vanbever.pdf?>. (Year: 2013).*

* cited by examiner

DATA UPGRADING METHODS AND DEVICES FOR ROBOTS

CROSS REFERENCE TO RELATED APPLICATIONS

This application claims priority to Chinese Patent Application No. 201611253848.0, filed Dec. 30, 2016, which is hereby incorporated by reference herein in its entirety.

BACKGROUND

1. Technical Field

The present disclosure relates to communication field, and particularly to a data upgrading method and a device for robot.

2. Description of Related Art

Controller Area Network (CAN) bus is a serial communication protocol for real-time applications, and is a point-to-multipoint mechanism. The CAN has been adopted in a variety of industries, such as, textile machinery, agricultural machinery, robots, CNC machine tools, medical equipment and sensors.

The demanding of the reliability with respect to the data-processing and the communication system has become higher, as the complexity of the device, the harshness of application environment, and the complexity of the system tasks have been increased. Therefore, it is necessary to improve the communication process of the CAN bus protocol.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

A data transmission method and a device in the present disclosure are based on a controller area network (CAN) bus. A master node in the device is configured to be a control center to control each node within the device. In one embodiment, the master node is a main controller in a robot and nodes are servos of the robot. The main controller may transmit broadcast messages to each of the nodes via a broadcast channel, and may respectively configure a channel for each of the nodes. As such, the main controller may communicate with the respective node via the channel, and the device may achieve a variety of functions under different application scenarios, wherein the nodes may correspond to different elements under the different application scenarios. For example, a robot, the node may include joint servo steering gear, drive wheel, sensor, and dot matrix display.

The present disclosure relates to a data frame including a standard data frame and an extended data frame, wherein the standard data frame and the extended data frame are configured to improve the conventional standard data frame and the conventional extended data frame within the CAN bus 2.0B.

In the CAN bus 2.0B, the data frame may include a plurality of fields, including a frame start, an arbitration field, a control field, a data field, a cyclic redundancy check (CRC) field, a response field, and a frame end. Wherein the arbitration field may include an identity (ID) sub-field and other flags. The ID sub-field carries the identity of the node, wherein the identity of the node is configured to indicate the different nodes. The main difference between the standard data frame and the extended data frame resides in that the number of bits of the ID sub-field of the arbitration field is different. The number of bits of the ID sub-field of the arbitration field in the standard data frame is 11, and the number of bit of the ID sub-field of the arbitration field in the extended data frame is 29.

The data frame of the present disclosure is configured to improve the ID sub-field and data field of the arbitration field. However, only the enhancement will be described below.

1. The Standard Data Frame in the Present Disclosure.

1.1 the ID Sub-Field of the Arbitration Field.

The difference between the conventional CAN bus 2.0B and the standard data frame in present disclosure is illustrated in Table 1.

In one embodiment, the standard data frame includes a frame-mode indication sub-field and a channel identification field.

The frame-mode indication sub-field includes 2 bits, including M1 and M0, wherein the frame-mode indication sub-field is configured to indicate an analytical method of the frame.

The channel identification field includes 9 bits, including by CH8 to CH0, wherein the channel identification field is configured to indicate the identity of the channel between the main controller and the node. The value of the channel in the standard data frame is in a range from 0 to 511. When the value of the channel identification field is zero, it is determined that the channel is a broadcast channel, wherein each of the nodes may receive messages transmitted from the main controller via the broadcast channel.

TABLE 1

| CAN bus 2.0B | ID sub-field (11 bits) | | | | | | | | | | |
|---|---|---|---|---|---|---|---|---|---|---|---|
| | ID10 | ID9 | ID8 | ID7 | ID6 | ID5 | ID4 | ID3 | ID2 | ID1 | ID0 |
| Examples | M1 | M2 | CH8 | CH7 | CH6 | CH5 | CH4 | CH3 | CH2 | CH1 | CH0 |

The difference between the conventional CAN bus 2.0B and the extended data frame in present disclosure is illustrated in Table 2.

The extended data frame in the present disclosure includes the frame-mode indication sub-field, the channel identification field, and a flag field.

The frame-mode indication sub-field includes 3 bits, including M1, M0, and EM0, wherein the frame-mode indication sub-field is configured to indicate the analytical method of the frame.

The flag field includes 10 bits. N indicates a reserved bit, END is configured to indicate the last frame. For example, if the value of the END equals to zero, it is determined that the frame is not the last frame. If the value of the END equals to 1, the frame is configured to be the last frame. "I" is a self-increasing cycle code configured to indicate a sending serial number of the frame.

The channel identification field includes 16 bits illustrating by CH15 to CH0, wherein the channel identification field is configured to indicate the channel between the main controller and the node. The value of the channel identification field in the extended data frame is in a range from 0 to 65535. The zero value indicates the broadcast channel, wherein each of the nodes may receive messages transmitted from the main controller via the broadcast channel.

TABLE 2

| CAN bus 2.0B | ID sub-field (29 bits) | | | | | | | | | | | |
|---|---|---|---|---|---|---|---|---|---|---|---|---|
| | ID10 | ID9 | ID8 | ID7 | ID6 | ID5 | ... | ID0 | EID17 | EID16 | EID15 | ... EID0 |
| Example | M1 | M2 | EM0 | N | END | 17 | ... | 12 | 11 | 10 | CH15 | ... CH0 |

An example of the frame-mode indication sub-field of the present disclosure is shown in Table 3. It is note that the different values of the frame-mode indication sub-field may indicate different analytical methods of the frame, wherein the different analytical method are configured to different application scenarios.

| M1 | M0 | EM0 | Description | Remarks |
|---|---|---|---|---|
| 0 | 0 | 0 | Node controlling instruction frame | Adopting the standard data frame if the identity of the channel corresponding to the node is less than 512, so as to improve the efficiency of the bus |
| 0 | 1 | 0 | Node return instruction frame | |
| 0 | 0 | 1 | Upload node string code | Adopting the extended data frame to transmit data |
| 0 | 1 | 1 | Frame for configuring the channel of the node | |
| 1 | 0 | 0 | Block control instruction frame | Adopting the extended data frame to transmit data |
| 1 | 1 | 0 | Block return instruction frame | |
| 1 | 0 | 1 | Block data output frame | |

-continued

| M1 | M0 | EM0 | Description | Remarks |
|---|---|---|---|---|
| 1 | 1 | 1 | Block data input frame | |

1.2 Data Field.

The difference between the conventional CAN bus 2.0B and the data field of the data frame in present disclosure is illustrated in Table 4.

The data field of the data frame in present disclosure may include a (CMD) field of 1 bit, indicating the different analytical methods of the frame. The (CMD) field is configured to indicate a secondary instruction, and the different values of the (CMD) field may represent the different secondary instructions. The (CMD) field includes 7 bits, from D0 to D6, indicating the data carried by the secondary instruction. The data fields of the block data output frame and the block data input frame respectively include eight bits which are configured to carry the data, so as to improve the transmission efficiency of the block data.

TABLE 4

| | Data field (8 bits) | | | | | | | |
|---|---|---|---|---|---|---|---|---|
| CAN bus 2.0B | D0 | D1 | D2 | D3 | D4 | D5 | D6 | D7 |
| Node controlling instruction frame | CMD | D0 | D1 | D2 | D3 | D4 | D5 | D6 |
| Node return instruction frame | CMD | D0 | D1 | D2 | D3 | D4 | D5 | D6 |
| Upload node string code | D0 | D1 | D2 | D3 | D4 | D5 | D6 | D7 |
| Frame for configuring the channel of the node | D0 | D1 | D2 | D3 | D4 | D5 | D6 | D7 |
| Block control instruction frame | CMD | D0 | D1 | D2 | D3 | D4 | D5 | D6 |
| Block return instruction frame | CMD | D0 | D1 | D2 | D3 | D4 | D5 | D6 |
| Block data output frame | D0 | D1 | D2 | D3 | D4 | D5 | D6 | D7 |
| Block data input frame | D0 | D1 | D2 | D3 | D4 | D5 | D6 | D7 |

Figure 1:
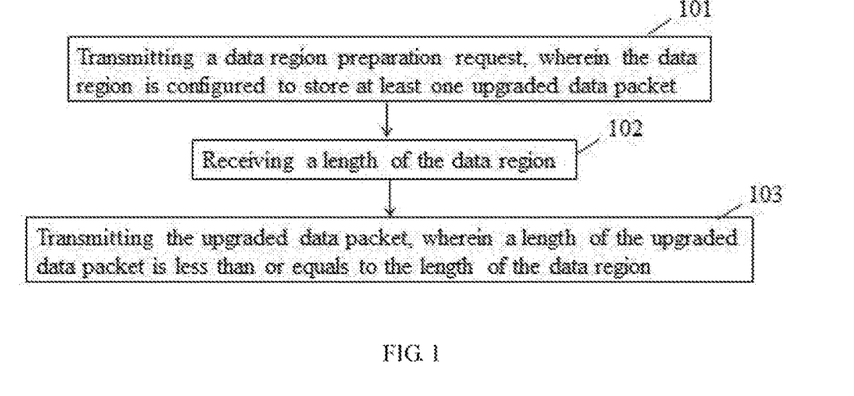
FIG. 1 is a flowchart illustrating a data upgrading method in accordance with one embodiment of the present disclosure.

In one example, referring to FIG. 1, the present disclosure relates to a data upgrading method for communication between the main controller of the robot and the at least one node of the robot. The data upgrading method may be adopted by the main controller, including the following steps.

In step 101: transmitting a data region preparation request, wherein the data region is configured to store at least one upgraded data packet.

In step 102: receiving a length of the data region.

In step 103: transmitting the upgraded data packet, wherein a length of the upgraded data packet is less than or equals to the length of the data region.

The present disclosure relates to the data upgrading method for communication between the main controller of the robot and the at least one node of the robot, wherein the node may inform the length of the data region to the main controller after the node has prepared the data region for storing the upgraded data packet, so as to avoid abnormal operations and to enhance the reliability.

Figure 2:
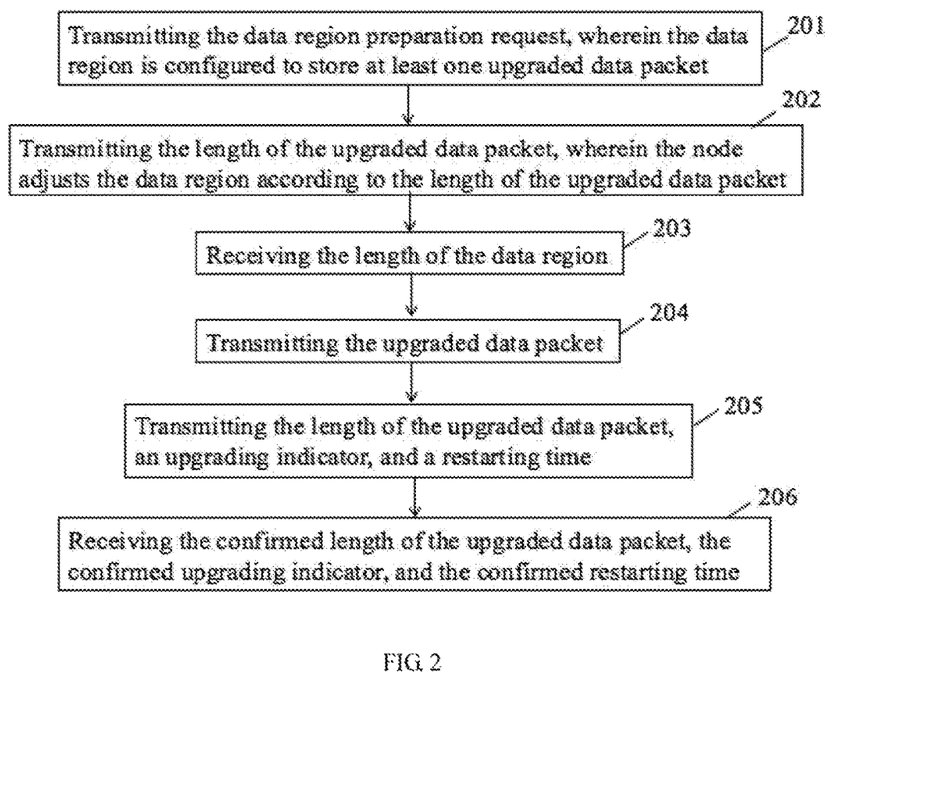
FIG. 2 is a flowchart illustrating a data upgrading method in accordance with one embodiment of the present disclosure.

In one example, as shown in FIG. 2, the present disclosure relates to the data upgrading method for communication between the main controller of the robot and the at least one node of the robot. The data upgrading method may be adopted by the main controller, including the following steps.

In step 201: transmitting the data region preparation request, wherein the data region is configured to store at least one upgraded data packet.

The step of transmitting the data region preparation request further includes transmitting a data region erasing request, receiving a data region erasing response, wherein the data region erasing response carries the length of the data region that has been erased.

The data region erasing request may be transmitted via the block control instruction frame, wherein the block control instruction frame adopts the extended data frame. A value of the frame-mode indication sub-field of the ID sub-field in the arbitration field is configured to be M1M0EM0=100, and a value of the channel identification field indicates the channel being allocated by the main controller to the node for transmitting the data upgrading. Table 5 illustrates that a value of the data region at $0^{th}$ bit is configured to be FC, indicating that the main controller requests the node to erase the data region for storing the upgraded data packet. The data region erasing request has to be transmitted via the channel being allocated by the main controller to the node. If the data region erasing request is transmitted via the broadcast channel, the data region erasing request is deemed as an invalid operation, and the node may ignore the data region erasing request.

TABLE 5

| Bit | Description | Range of value | Usage | Remarks |
| --- | --- | --- | --- | --- |
| 0 | CMD | 0XFC | Main controller request the node to erase the data region for storing the upgraded data packet | Invalid via broadcast channel |

In one example, the data region erasing request may be transmitted via the block return instruction frame, wherein the block return instruction frame adopts the extended data frame. The value of the frame-mode indication sub-field of the ID sub-field in the arbitration field is configured to be M1M0EM0=110, and the value of the channel identification field indicates the channel being allocated by the main controller to the node for transmitting the data upgrading.

Table 6 illustrates the values of each bit of the data region within the block return instruction frame. The value of the $0^{th}$ bit (CMD) is configured to be "FB", indicating that the node responds to the main controller for the data region erasing request. The first bit to the fourth bit are configured to store a length of the data region within the upgraded data packet. The data region erasing request has to be transmitted via the channel being allocated by the main controller to the node. If the data region erasing request is transmitted via the broadcast channel, the data region erasing request is determined to be invalid.

TABLE 6

| Bit | Description | Range of value | Usage | Remarks |
| --- | --- | --- | --- | --- |
| 0 | CMD | 0XFE | Node responds to the main controller after the node erases the data Region completely | Invalid via broadcast channel |
| 1~4 | Length of data region | 0~4 G | Actual length of the erased data region | Unsigned number |

In step 202: transmitting the length of the upgraded data packet, wherein the node adjusts the data region according to the length of the upgraded data packet.

In one example, the length of the upgraded data packet is transmitted via the block control instruction frame, wherein the block control instruction frame adopts the extended data frame. The value of the frame-mode indication sub-field of the ID sub-field in the arbitration field is configured to be M1M0EM0=100, and the value of the channel identification field indicates the channel being allocated by the main controller to the node for transmitting the data upgrading. Table 7 illustrates the value of the data region at $0^{th}$ bit is configured to be "FA", indicating that the main controller requests the node to transmit the upgraded data packet. The first bit to the fourth bit are configured to store the length of the upgraded data packet. The data region erasing request has to be transmitted via the channel being allocated by the main controller to the node. If the data region erasing request is transmitted via the broadcast channel, the length of the length of the upgraded data packet is determined to be invalid.

TABLE 7

| Bit | Description | Range of value | Usage | Remarks |
| --- | --- | --- | --- | --- |
| 0 | CMD | 0XFA | Main controller requests the node to transmit the upgraded data packet | Invalid via broadcast channel |
| 1~4 | Length of upgraded data packet | 0~4 G | Length of the upgraded data packet | Unsigned number |

In step 203: receiving the length of the data region.

In one example, the length of the data region is transmitted via the block return instruction frame, wherein the block return instruction frame adopts the extended data frame. The value of the frame-mode indication sub-field of the ID sub-field in the arbitration field is configured to be M1M0EM0=110, and the value of the channel identification field indicates the channel being allocated by the main controller to the node for transmitting the data upgrading. Table 8 illustrates values of each bit of the data region within the block return instruction frame. The value of the $0^{th}$ bit (CMD) is configured to be F9, indicating the node is ready to receive the upgraded data packet. The first bit to the fourth bit are configured to store the length of the data region of the upgraded data packet. The length of the data region has to be transmitted via the channel being allocated by the main controller to the node. If the data region erasing request is transmitted via the broadcast channel, the length of the length of the upgraded data packet is determined to be invalid.

TABLE 8

| Bit | Description | Range of value | Usage | Remarks |
|---|---|---|---|---|
| 0 | CMD | 0XF9 | Node is ready to receive the upgraded data packet | Invalid via broadcast channel |
| 1~4 | Length of data region | 0~4 G | Actual length of the data region | Unsigned number |

The node may be aware of the length of the upgraded data packet, and may further adjust the data region which has been erased according to the length of the upgraded data packet. For example, if the length of the upgraded data packet is greater than the length of the data region which has been erased, the node may configure the length of the data region to be greater than the original length. If the length of the erased data region equals to or is greater than length of the upgraded data packet, the node may configure the length of the data region to be the same with the original length. Therefore, the length of the data region received by the main controller is greater than or equals to the length of the upgraded data packet in step 203.

In step 204: transmitting the upgraded data packet.

In one example, the step of transmitting the upgraded data packet further includes: transmitting at least one block data message, wherein each of the block data messages carries at least one block data, a predetermined sending sequence number, and an indicator indicating an end of the data upgrading transmission process.

In one example, the block data message may be transmitted via the block data output frame, wherein the block data output frame adopts the extended data frame. The value of the frame-mode indication sub-field of the ID sub-field in the arbitration field is configured to be M1M0EM0=101, The value of the channel identification field indicates the channel being allocated by the main controller to the node for transmitting the data upgrading, "1" indicates the predetermined sending sequence number, and END indicates an end of the transmission process. The CMD may be excluded from the data field of the block data output frame, and thus the 8 bits of the data field may carry the data, which improves the transmission efficiency.

In one example, the block data message is transmitted according to a predetermined sending sequence. The predetermined sending sequence in the block data message indicates the current number of the block data message to be transmitted. Wherein the predetermined sending sequence may be arranged in an ascending order.

A last block data message of the block data messages that has been transmitted is configured to be retransmitted when a predetermined condition is satisfied. The predetermined condition may include: the upgraded data packet is transmitted completely, the predetermined sending sequence number of the last block data message that has been transmitted is greater than a maximum value, or the predetermined sending sequence number of the last block data message that has been transmitted is over half and greater than the maximum value. In one example, the predetermined sending sequence "1" may include 8 bytes, it is determined that the sending sequence number is over half of the maximum value if the sending sequence number is greater than 127. Also, it is determined that the sending sequence number is overflow if the sending sequence number is greater than 255.

The node receives each of the block data messages according to the predetermined sending sequence. The abnormal block data may be detected by the predetermined sending sequence number of the block data message. When the node receives the retransmitted last block data message, the node may transmit the predetermined sending sequence number corresponding to the abnormal block data, so as to inform the main controller that the abnormal block data is retransmitted. If all of the block data is normally received, the predetermined sending sequence number transmitted by the node is configured to be zero, so as to inform the main controller that there is no abnormal block data.

The main controller receives the predetermined sending sequence number of the abnormal block data. If the received predetermined sending sequence number is not equal to zero, the main controller retransmits the block data message of the block data corresponding to the received predetermined sending sequence number, and retransmit the last block data message of the block data messages that has been transmitted. If the received predetermined sending sequence number equal to zero, the main controller may transmit a next block data message or terminate the transmission process. Wherein transmitting the next block data message the predetermined sending sequence number is over half, retransmitting the last block data message of the block data messages when the predetermined sending sequence number is overflow, and terminating the transmission process when the main controller completely transmits all of the block data messages and retransmits the last block data message.

The predetermined sending sequence number of the abnormal block data is transmitted via the block return instruction frame, wherein the block return instruction frame adopts the extended data frame. The value of the frame-mode indication sub-field of the ID sub-field in the arbitration field is configured to be M1M0EM0=110, and the value of the channel identification field indicates the channel being allocated by the main controller to the node for transmitting the data upgrading. Table 9 illustrates values of each bit of the data region within the block return instruction frame. The value of the $0^{th}$ bit (CMD) is configured to be "F5", indicating the node reports the abnormal block data to the main controller. The first bit indicates the number of the abnormal block data, and the second bits to the seventh bit are configured to receive the predetermined sending sequence number of the abnormal block data. The predetermined sending sequence number of the abnormal block data has to be transmitted via the channel being allocated by the main controller to the node. If the data region erasing request is transmitted via the broadcast channel, the length of the length of the upgraded data packet is determined to be invalid.

TABLE 9

| Bit | Description | Range of value | Usage | Remarks |
|---|---|---|---|---|
| 0 | CMD | 0XF5 | Node reports the abnormal block data to the main controller | Invalid via broadcast channel |

TABLE 9-continued

| Bit | Description | Range of value | Usage | Remarks |
|---|---|---|---|---|
| 1 | Number of the abnormal block data | 0~6 | The absolutely value indicates the number of the block data that has not been received | |
| 2~7 | Sequence number corresponding to the abnormal block data | 0~255 | Sequence number of the block data that has not been received Sending rule: 1. If the CRC code is greater than 127 or the CRC code is overflow 2. If the number of the block data that has not been received equals to 6 3. When the block data transmission process is over | Unsigned number |

In step 205: transmitting the length of the upgraded data packet, an upgrading indicator, and a restarting time.

In one example, the length of the upgraded data packet, the upgrading indicator, and the restarting time are transmitted via the block control instruction frame, wherein the block return instruction frame adopts the extended data frame. The value of the frame-mode indication sub-field of the ID sub-field in the arbitration field is configured to be M1M0EM0=100, and the value of the channel identification field indicates the channel being allocated by the main controller to the node for transmitting the data upgrading. Table 10 illustrates values e of the 0$^{th}$ bit (CMD) is configured to be "F8", indicating the main controller informs the node that the transmission of the data upgrading is over. The first bit to the fourth bit are configured to be the length of the upgraded data packet that has been transmitted. The fifth bit ("upgraded indicator") indicates whether the data has to be upgraded. If the fifth bit is set, the node performs an upgrading process after being rebooted. The sixth bit indicates the restarting time of the node. The block control instruction frame has to be transmitted via the channel being allocated by the main controller to the node. If the data region erasing request is transmitted via the broadcast channel, the length of the length of the upgraded data packet is determined to be invalid.

TABLE 10

| Bit | Description | Range of value | Usage | Remarks |
|---|---|---|---|---|
| 0 | CMD | 0XF8 | Main controller informs the node that the transmission of the data upgrading is over | Invalid via broadcast channel |
| 1~4 | Length of the data packet | 0~4 G | Length of the upgraded data packet that has been transmitted | Unsigned number |
| 5 | Whether the upgrading indicator is set | 0~1 | 0: Upgrading indicator is not set 1: Upgrading indicator is set | |
| 6 | Restarting time of the node(reset) | 0~255 | 0: No restart (reset) 1~255: period of time (second) before restart | When the node is rebooted, the node detects the upgrading indicator. If the |

TABLE 10-continued

| Bit | Description | Range of value | Usage | Remarks |
|---|---|---|---|---|
| | | | | upgrading indicator is set, the process goes to an upgrading process. If the upgrading indicator is not set, the process goes to a normal starting process |

In step 206: receiving the confirmed length of the upgraded data packet, the confirmed upgrading indicator, and the confirmed restarting time.

In one example, the confirmed length of the upgraded data packet, the confirmed upgrading indicator, and the confirmed restarting time may be transmitted via the block return instruction frame, wherein the block return instruction frame adopts the extended data frame. The value of the frame-mode indication sub-field of the ID sub-field in the arbitration field is configured to be M1M0EM0=110, and the value of the channel identification field indicates the channel being allocated by the main controller to the node for transmitting the data upgrading. Table 11 illustrates values of each bit of the data region within the block return instruction frame. The value of the 0$^{th}$ bit (CMD) is configured to be "F7", indicating that the node responds to the main controller for the end of the upgraded data packet. The first bit to the fourth bit are configured to indicate the length of the received upgraded data packet. The fifth bit is configured to indicate the upgrading indicator. If the upgrading indicator is set, the node may perform the upgrading process after restarting. The sixth bit is configured to indicate the restarting time of the node. The block return instruction frame has to be transmitted via the channel being allocated by the main controller and the node. If the block return instruction frame is transmitted via the broadcast channel, the block return instruction frame is determined to be invalid.

TABLE 11

| Bit | Description | Range of value | Usage | Remarks |
|---|---|---|---|---|
| 0 | CMD | 0XF7 | Node responds to main controller for the end of the upgraded data packet. | Invalid via broadcast channel |
| 1~4 | Length of the data packet | 0~4 G | Length of the upgraded data packet that has been received | Unsigned number |
| 5 | Response for upgrading indicator | 0~2 | 0: Upgrading indicator is not set 1: Upgrading indicator is set 2: Upgrading indicator is invalid | |
| 6 | Rebooting time of the node (reset) | 0~255 | 0: No reboot (reset) 1~255: period of time (second) before reboot | When the node is rebooted, the node detects the upgrading indicator. If the upgrading indicator is set, the process goes to an upgrading |

TABLE 11-continued

| Bit | Description | Range of value | Usage | Remarks |
|---|---|---|---|---|
| | | | | process. If the upgrading indicator is not set, the process goes to a normal starting process |

In another example, the step 202 may be excluded from the data upgrading method. The step of transmitting the data region preparation request may be replaced by the step of transmitting the data region erasing request, and the step of receiving the length of the data region may be replaced by the step of receiving the data region erasing response. Therefore, the main controller may not need to inform the length of the upgraded data packet to the node, and the length of the data region that has been erased may be greater than or equal to the length of the upgraded data packet. As such, the node may erase the data region according to a length of a predetermined data region, wherein the length of the predetermined data region may be greater than or equal to the length of the upgraded data packet.

Figure 3:
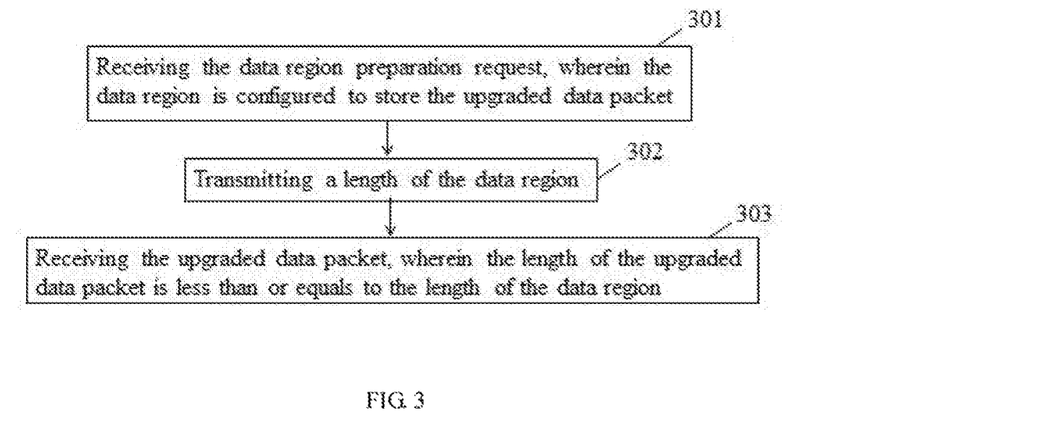
FIG. 3 is a flowchart illustrating a data upgrading method in accordance with one embodiment of the present disclosure.

In one example, as shown in FIG. 3, the present disclosure relates to the data upgrading method for communication between the main controller of the robot and the at least one node of the robot. The method may be adopted by the node, wherein the method includes the following steps.

In step 301: receiving the data region preparation request, wherein the data region is configured to store the upgraded data packet.

In step 302: transmitting a length of the data region.

In step 303: receiving the upgraded data packet, wherein the length of the upgraded data packet is less than or equals to the length of the data region.

The present disclosure relates to the data upgrading method for communication between the main controller of the robot and the at least one node of the robot, wherein the node may transmit the length of the data region to the main controller after the data region of the node is configured for storing the upgraded data packet, so as to avoid abnormal operations and to enhance the reliability.

Figure 4:
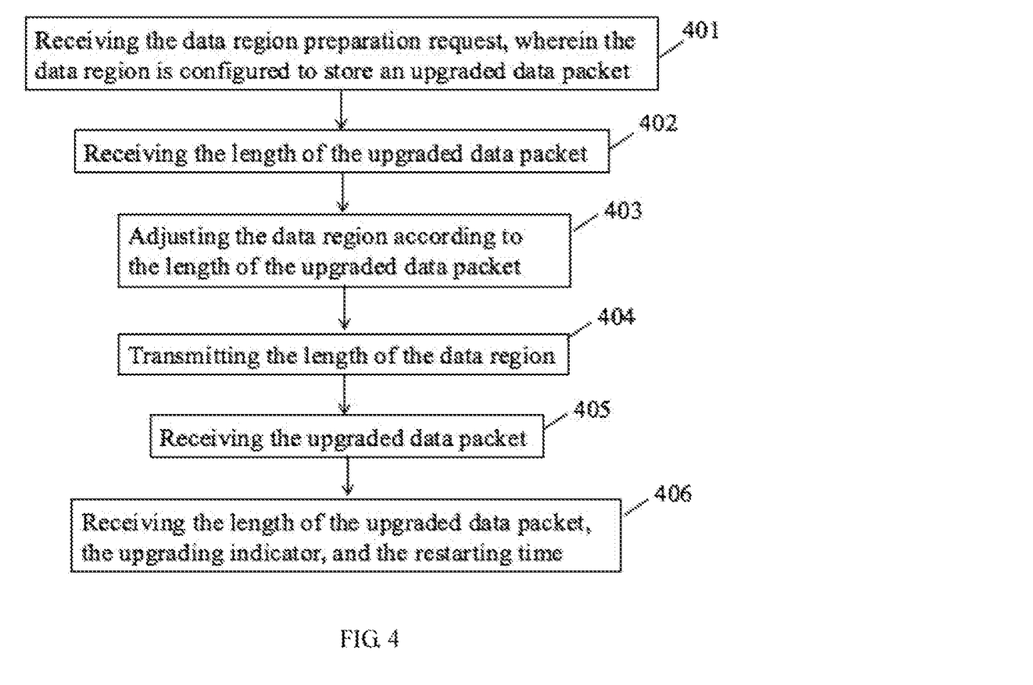
FIG. 4 is a flowchart illustrating a data upgrading method in accordance with one embodiment of the present disclosure.

In one example, as shown in FIG. 4, the present disclosure relates to the data upgrading method for communication between the main controller of the robot and the at least one node of the robot. The method may be adopted by the node, wherein the method includes the following steps.

In step 401: receiving the data region preparation request, wherein the data region is configured to store an upgraded data packet.

The step of receiving the data region preparation request may further includes: receiving the data region erasing request and transmitting the data region erasing response.

In one example, the data region preparation request may be transmitted via the block control instruction frame, wherein the block control instruction frame adopts the extended data frame. The value of the frame-mode indication sub-field of the ID sub-field in the arbitration field is configured to be the same with the step 201.

In one example, the data region preparation response may be transmitted via the block return instruction frame, wherein the block return instruction frame adopts the extended data frame. The value of the frame-mode indication sub-field of the ID sub-field in the arbitration field is configured to be the same with the step 201.

In step 402: receiving the length of the upgraded data packet.

In one example, the length of the upgraded data packet may be transmitted via the block control instruction frame, wherein the block control instruction frame adopts the extended data frame. The value of the frame-mode indication sub-field of the ID sub-field in the arbitration field is configured to be the same with the step 202.

In step 403: adjusting the data region according to the length of the upgraded data packet.

The node may adjust the data region that has been erased according to the length of the upgraded data packet. For example, if the length of the upgraded data packet is greater than the length of the data region which has been erased, the node may configure the length of the data region to be greater than the original length. If the length of the erased data region equals to or is greater than length of the upgraded data packet, the node may configure the length of the data region to be the same with the original length.

In step 404: transmitting the length of the data region.

In one example, the length of the data region may be transmitted via the block return instruction frame, wherein the block return instruction frame adopts the extended data frame. The value of the frame-mode indication sub-field of the ID sub-field in the arbitration field is configured to be the same with the step 203.

In step 405: receiving the upgraded data packet.

In one example, the step of receiving the upgraded data packet further includes: receiving at least one block data message, wherein each of the block data messages carries at least one block data, a predetermined sending sequence number, and an indicator indicating an end of the data upgrading transmission process.

Wherein the step of receiving at least one block data message further includes: receiving the at least one block data message according to a predetermined sending sequence, receiving the retransmitted a last block data message of the block data messages that has been transmitted, transmitting an abnormal receiving message indicating a predetermined sending sequence number of the abnormal block data when an abnormal block data is detected, transmitting the abnormal block data message with the predetermined sending sequence number equal to zero when the abnormal block data when no abnormal block data is detected. The format of the abnormal receiving message is configured to be the same with the format described in step 204.

In step 406: receiving the length of the upgraded data packet, the upgrading indicator, and the restarting time.

In one example, the length of the upgraded data packet, the upgrading indicator, and the restarting time are transmitted via the block control instruction frame, wherein the block control instruction frame adopts the extended data frame. The value of the frame-mode indication sub-field of the ID sub-field in the arbitration field is configured to be the same in step 205.

In step 407: transmitting the confirmed length of the upgraded data packet, the confirmed upgrading indicator, and the confirmed restarting time.

In one example, the confirmed length of the upgraded data packet, the confirmed upgrading indicator, and the confirmed restarting time may be transmitted via the block return instruction frame, wherein the block return instruction frame adopts the extended data frame. The value of the frame-mode indication sub-field of the ID sub-field in the arbitration field is configured to be the same in step 206.

In another example, the step 402 and step 403 may be excluded from the upgrading method. The step of receiving the data region preparation request may be replaced by the step of receiving the data region erasing request, and the step of transmitting the length of the data region may be replaced by the step of transmitting the data region erasing response. Therefore, the main controller may not need to inform the length of the upgraded data packet to the node, and the length of the data region that has been erased may be greater than or equal to the length of the upgraded data packet. As such, the node may erase the data region according to a length of a predetermined data region, wherein the length of the predetermined data region may be greater than or equal to the length of the upgraded data packet.

The following description is an example of the present disclosure applied to an application scenario. Assuming the channel identification is configured to be 10.

1. The main controller transmits the data region erasing request to the node, and the value of each field is defined as follow. M1M0EM0=100, channel=10, CMD=0XFC.

2. The node transmits the data region erasing response to the main controller, and the value of each field is defined as follow. M1M0EM0=110, channel=10, CMD=0XFB, D1~D4=7K.

3. The main controller transmits a first block data output frame to the node, and the value of each field is defined as follow. M1M0EM0=101, channel=10, END=0, I=0, D0~D7 equals to a first 8 bits of the upgrading data packet.

4. The main controller transmits a second block data output frame to the node, and the value of each field is defined as follow. M1M0EM0=101, channel=10, END=0, I=1, D0~D7 equals to a second 8 bits of the upgrading data packet.

5. The main controller transmits a n-th block data output frame to the node, and the value of each field is defined as follow. M1M0EM0=101, channel=10, END=0, I=n−1, D0~D7 equals to a n-th 8 bits of the upgrading data packet.

6. The main controller retransmits a 127-th block data output frame to the node after the main controller transmits the 127-th block data output frame.

7. The node transmits the predetermined sending sequence number corresponding to the block data that is abnormally received after the node receives the retransmitted 127-th block data output frame. Assuming the predetermined sending sequence numbers of the abnormal block data are 5, 7, 15, 20, and 29, the value of each field of the block return instruction frame transmitted by the node is defined as follow. M1M0EM0=110, channel=10, CMD=0XF5, D1=5, D2~D7=5, 7, 15, 20, 29.

8. The main controller retransmits the abnormal block data output frame to the node.

9. The main controller retransmits the 127-th block data output frame.

10. The node transmits the predetermined sending sequence number corresponding to the abnormal block data to the main controller, wherein the predetermined sending sequence number equals to zero, indicating there is no any abnormal block data. The value of each field is defined as follow. M1M0EM0=110, channel=10, CMD=0XF5, D1=0.

11. The main controller transmits a 128-th block data output frame to the node. The method of transmitting the block data output frame is the same with the above steps. The main controller may transmit the last block data output frame after all of the block data output frames has completely transmitted, and the node may receive the predetermined sending sequence number corresponding to the abnormal block data until no abnormal block data is received.

12. The main controller transmits the block control instruction frame indicating the end of the data upgrading process, and the value of each field is defined as follow. M1M0EM0=100, channel=10, CMD=0XF8, D1~D4=2K, D5=1, D6=2. D5=1 indicates the upgrading indicator is set, and 136=2 indicates the node may be restarted and the upgrading process is conducted in two seconds.

13. The node transmits the block return control frame to the main controller to confirm the data upgrading process is over. The value of each field is defined as follow. M1M0EM0=110, channel=10, CMD=0XF7, D1~D4=2K, D1=1, D6=2, D5=1 indicates the upgrading indicator is set, and D6=2 indicates the node may be restarted and conduct the upgrading process in two seconds.

Figure 5:
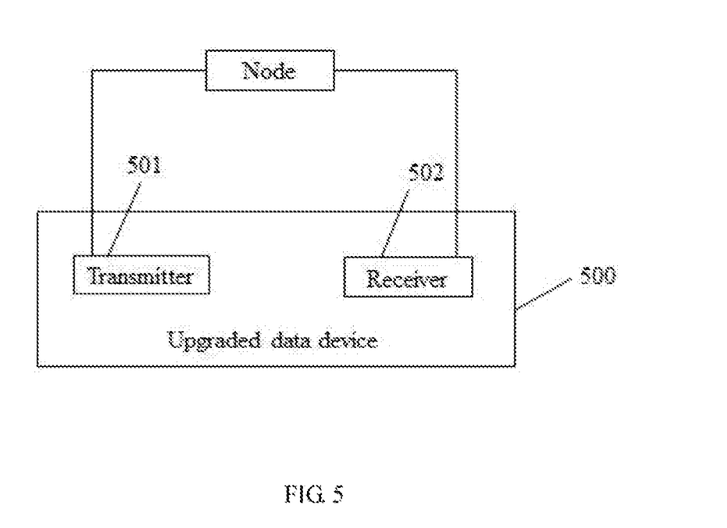
FIG. 5 is a schematic view of a data upgrading device in accordance with one embodiment of the present disclosure.

In another aspect, as shown in FIG. 5, the present disclosure further relates to a data upgrading device for robot. A data upgrading device 500 may be adopted by the main controller, including a transmitter 501 and a receiver 502.

The transmitter 501 is configured to transmit the data region preparation request and the upgrading data packet, wherein the data region is configured to store the upgrading data packet, and the length of the upgrading data packet is less than or equals to the length of the data region.

The receiver 502 is configured to receive the length of the data region.

In one example, the transmitter 501 is further configured to transmit the length of the upgrading data packet before receiving the length of the data region and to adjust the data region according to the length of the upgrading data packet.

In one example, the transmitter 501 is further configured to transmit the data region erasing request. Correspondingly, the receiver 502 is further configured to receive the data region erasing response, wherein the data region erasing response carries the length of the data region that has been erased.

In view of the above, the main controller may transmit the length of the upgraded data packet to the node, so that the node may adjust the length of the data region that has been erased according to the length of the data upgrading packet.

In one example, the transmitter 501 may be further configured to transmit the data region erasing request. Correspondingly, the receiver 502 may be further configured to receive the data region erasing response, wherein the data region erasing response carries the length of the data region which has been erased.

Therefore, the main controller may not need to inform the length of the upgraded data packet to the node, and the length of the data region that has been erased may be greater than or equal to the length of the upgraded data packet.

In one example, the transmitter 501 may be further configured to transmit the length of the upgrading data packet, the upgrading indicator, and the restarting time. Correspondingly, the receiver may be further configured to receive the confirmed length of the upgraded data packet, the confirmed upgrading indicator, and the confirmed restarting time.

In one example, the transmitter 501 may be further configured to transmit the at least one block data message, wherein each of the block data messages carries the at least one block data, the predetermined sending sequence number, and the indicator indicating the end of the upgrading data transmission process. Each of the block data is a portion of the upgrading data packet.

In one example, the transmitter 501 may be further configured to: transmit the at least one block data message according to the predetermined sending sequence, retransmit the last block data message of the block data messages that has been transmitted upon determining a predetermined condition being satisfied, retransmit the abnormal block data message and retransmitting the last block data message of the block data messages that has been transmitted upon determining the predetermined sending sequence number of the abnormal block data message that the receiver 502 receives is less than or is greater than zero, transmit the next block data message or terminating the upgraded data packet transmission process upon determining the predetermined sending sequence number of the abnormal block data message that the receiver 502 receives equals to zero.

Figure 6:
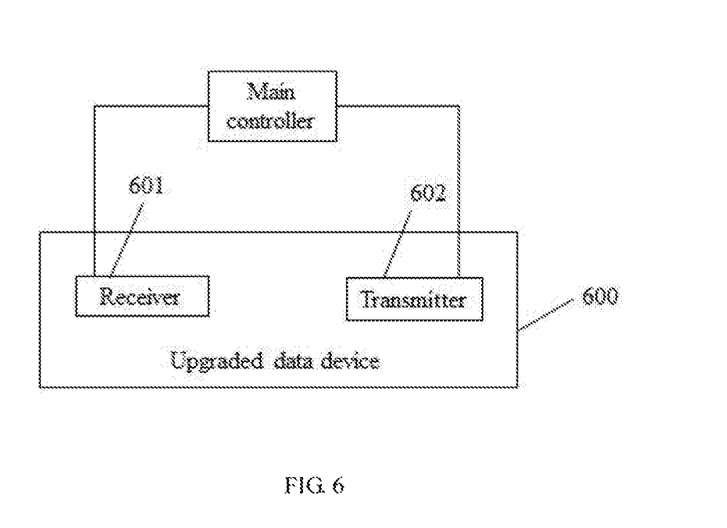
FIG. 6 is a schematic view of a data upgrading device in accordance with one embodiment of the present disclosure.

In one example, as shown in FIG. 6, the present disclosure relates to the data upgrading device 600 for communication between the main controller of the robot and the at least one node of the robot, and may be adopted by the node, wherein the device may include the receiver 601 and the transmitter 602.

The receiver 601 is configured to receive the data region preparation request and an upgrading data packet, wherein the data region is configured to store the upgrading data packet and the length of the upgrading data packet is less than or equals to the length of the data region;

The transmitter 602 is configured to transmit the length of the data region.

In one example, the receiver 601 may be further configured to receive the length of the upgrading data packet before receiving the length of the data region. Correspondingly, the device 600 may further include a processor 603 configured to adjust the data region according to the length of the upgrading data packet.

The receiver 601 may be further configured to receive the data region erasing request. Correspondingly the transmitter 602 may be further configured to transmit the data region erasing response, wherein the data region erasing response carries the length of the data region which has been erased.

In view of the above, the main controller may transmit the length of the upgraded data packet to the node, so that the node may adjust the length of the data region that has been erased according to the length of the data upgrading packet.

In one example, the receiver 601 may be further configured to receive the length of the upgrading data packet, the upgrading indicator, and the restarting time. Correspondingly, the transmitter 602 may be further configured to transmit the confirmed length of the upgraded data packet, the confirmed upgrading indicator, and the confirmed restarting time.

In one example, the receiver 601 may be further configured to receive the at least one block data message, wherein each of the block data messages carries at least one block data, the predetermined sending sequence number, and the indicator indicating an end of the upgrading data transmission process. Each of the block data is a portion of the upgrading data packet.

The receiver 601 may be further configured to: receive the at least one block data message according to the predetermined sending sequence and to receive a last block data message of the block data messages that has been transmitted. Correspondingly, the transmitter 602 may be further configured to: transmit the abnormal receiving message indicating the predetermined sending sequence number of the abnormal block data when an abnormal block data is detected and to transmit the abnormal block data message with the predetermined sending sequence number equal to zero when the abnormal block data when no abnormal block data is detected.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A data upgrading method for a robot comprising a main controller and at least one node electrically connected to the main controller via a controller area network bus, the method comprising:
   transmitting, by the main controller, a data region preparation request requesting to prepare a data region to the at least one node;
   configuring, by the at least one node, the data region to store at least one upgraded data packet in response to the data region preparation request, and transmitting a length of the data region to the main controller;
   receiving, by the main controller, the length of the data region, and transmitting the at least one upgraded data packet to the at least one node according to a predetermined sending sequence, wherein the length of the data region is greater than or equal to a length of the at least one upgraded data packet;
   transmitting, by the main controller, the length of the at least one upgraded data packet, an upgrading indicator, and a restarting time to the at least one node;
   receiving, by the at least one node, the at least one upgraded data packet and saving the at least one upgraded data packet in the data region;
   receiving, by the at least one node, the length of the at least one upgraded data packet, the upgrading indicator, and the restarting time; and
   transmitting, by the at least one node, a confirmed length of the at least one upgraded data packet, a confirmed upgrading indicator, and a confirmed restarting time;
   wherein the length of the at least one upgraded data packet, the upgrading indicator, and the restarting time are transmitted via a block control instruction frame;
   the confirmed length of the at least one upgraded data packet, the confirmed upgrading indicator, and the confirmed restarting time are transmitted via a block return instruction frame.

2. The data upgrading method according to claim 1, wherein the step of transmitting, by the main controller, the data region preparation request requesting to prepare the data region to the at least one node, comprises:
   transmitting, by the main controller, a data region erasing request;
   the step of receiving, by the main controller, the length of the data region comprises:
   receiving, by the main controller, a data region erasing response, wherein the data region erasing response carries the length of a data region erased.

3. The data upgrading method according to claim 2, wherein the step of configuring, by the at least one node, the data region to store the at least one upgraded data packet in response to the data region preparation request, and transmitting a length of the data region to the main controller, comprises:
   erasing, by the at least one node, the data region according to a length of a predetermined data region in response to the data region erasing request; and transmitting the data region erasing response to the main controller.

4. The data upgrading method according to claim 3, wherein between the step transmitting, by the main controller, the data region preparation request requesting to prepare the data region to the at least one node, and the step of configuring, by the at least one node, the data region to store the at least one upgraded data packet in response to the data region preparation request, the method further comprises:

transmitting, by the main controller, the length of the at least one upgraded data packet to the at least one node;

before the step of transmitting the length of the data region to the main controller, the method further comprises:

adjusting, by the at least one node, the data region erased according to the length of the at least one upgraded data packet from the main controller.

5. The data upgrading method according to claim 1, wherein the step of transmitting the at least one upgraded data packet to the at least one node according to the predetermined sending sequence, comprises:

transmitting at least one block data message to the at least one node according to the predetermined sending sequence, wherein each of the block data messages carries at least one block data, a predetermined sending sequence number, and an indicator indicating whether an end of the data upgrading transmission process.

6. The data upgrading method according to claim 5, wherein the step of transmitting the at least one block data message to the at least one node according to the predetermined sending sequence, comprises:

transmitting the at least one block data message to the at least one node according to the predetermined sending sequence arranged in an ascending order, wherein the predetermined sending sequence number in the at least one block data message indicates the current number of the at least one block data message to be transmitted.

7. The data upgrading method according to claim 6, wherein the step of transmitting the at least one block data message to the at least one node according to the predetermined sending sequence, further comprises:

retransmitting a last block data message of block data messages transmitted to the at least one node, in response to a predetermined condition being satisfied.

8. The data upgrading method according to claim 7, wherein the predetermined condition comprises:

the at least one block data message is transmitted completely; or a predetermined sending sequence number of the last block data message transmitted is greater than a maximum value; or the predetermined sending sequence number of the last block data message transmitted is over half and greater than the maximum value.

9. The data upgrading method according to claim 8, wherein the step of transmitting the at least one block data message to the at least one node according to the predetermined sending sequence, further comprises:

receiving an abnormal receiving message indicating a predetermined sending sequence number of an abnormal block data;

retransmitting a block data message of a block data corresponding to the predetermined sending sequence number of the abnormal block data to the at least one node, and retransmitting the last block data message of block data messages transmitted to the at least one node, in response to the predetermined sending sequence number of the abnormal block data being not equal to zero; and transmitting a next block data message or terminating transmission process of the at least one block data message, in response to the predetermined sending sequence number of the abnormal block data being equal to zero.

10. The data upgrading method according to claim 9, wherein the step of transmitting the next block data message comprises:

transmitting the next block data message in response to the last block data message of the block data messages transmitted being retransmitted when the predetermined sending sequence number is over half, or the predetermined sending sequence number is overflow;

the step of terminating the transmission process comprises:

terminating the transmission process in response to all of the at least one block data message being transmitted completely and the last block data message being retransmitted.

11. The data upgrading method according to claim 10, wherein the step of receiving, by the at least one node, the at least one upgraded data packet comprises:

receiving, by the at least one node, the at least one block data message according to the predetermined sending sequence;

receiving the retransmitted the last block data message of the block data messages transmitted;

transmitting the abnormal receiving message in response to the abnormal block data being detected; and transmitting the abnormal block data message with the predetermined sending sequence number equal to zero, in response to no abnormal block data being detected.

12. The data upgrading method according to claim 4, wherein the data region erasing request and the length of the at least one upgraded data packet are transmitted via a block control instruction frame, the data region erasing response and the length of the data region are transmitted via a block return instruction frame;

the block control instruction frame and the block return instruction frame adopt an extended data frame;

the extended data frame comprises an arbitration field and a data field;

the arbitration field comprises an identity sub-field, the identity sub-field comprises a frame-mode indication sub-field configured to indicate the analytical method of the frame, a channel identification field configured to indicate a channel being allocated by the main controller to the at least one node for transmitting a data upgrading, and a flag field; and the data field comprises a CMD field configured to indicate a secondary instruction, and data carried by the secondary instruction.

13. The data upgrading method according to claim 11, wherein the at least one block data message is transmitted via a block data output frame, the abnormal receiving message is transmitted via a block return instruction frame, the block data output frame and the block return instruction frame adopt an extended data frame;

the extended data frame comprises an arbitration field and a data field;

the arbitration field comprises an identity sub-field, the identity sub-field comprises a frame-mode indication sub-field configured to indicate the analytical method of the frame, a channel identification field configured to indicate a channel being allocated by the main controller to the at least one node for transmitting a data upgrading, and a flag field;

all bits of the data field of the block data output frame is configured to carry data; and the data field of the block return instruction frame comprises a CMD field configured to indicate a secondary instruction, and data carried by the secondary instruction.

14. The data upgrading method according to claim 1, wherein the block control instruction frame and the block return instruction frame adopt an extended data frame;

the extended data frame comprises an arbitration field and a data field;

the arbitration field comprises an identity sub-field, the identity sub-field comprises a frame-mode indication sub-field configured to indicate the analytical method of the frame, a channel identification field configured to indicate a channel being allocated by the main controller to the at least one node for transmitting a data upgrading, and a flag field; and the data field comprises a CMD field configured to indicate a secondary instruction, and data carried by the secondary instruction.

15. A data updating device electrically connected to at least one node of a robot via a controller area network bus, wherein the data updating device is configured for:

transmitting a data region preparation request requesting to prepare a data region to the at least one node, wherein the data region is configured to store at least one upgraded data packet;

receiving a length of the data region from the at least one node;

transmitting the at least one upgraded data packet to the at least one node according to a predetermined sending sequence, wherein the length of the data region is greater than or equal to a length of the at least one upgraded data packet;

transmitting the length of the at least one upgraded data packet, an upgrading indicator, and a restarting time to the at least one node; and receiving a confirmed length of the at least one upgraded data packet, a confirmed upgrading indicator, and a confirmed restarting time from the at least one node;

wherein the length of the at least one upgraded data packet, the upgrading indicator, and the restarting time are transmitted via a block control instruction frame;

the confirmed length of the at least one upgraded data packet, the confirmed upgrading indicator, and the confirmed restarting time are transmitted via a block return instruction frame.

16. The main controller of a robot according to claim 15, wherein the data updating device is further configured for:

transmitting a data region erasing request to the at least one node;

receiving a data region erasing response, wherein the data region erasing response carries the length of a data region erased; and transmitting the length of the at least one upgraded data packet to the at least one node.

17. A data updating device electrically connected to a main controller of a robot via a controller area network bus, wherein the data updating device is configured for:

receiving a data region preparation request requesting to prepare a data region from the main controller;

configuring the data region to store at least one upgraded data packet in response to the data region preparation request;

transmitting a length of the data region to the main controller;

receiving the at least one upgraded data packet form the main controller, wherein the length of the data region is greater than or equal to a length of the at least one upgraded data packet;

saving the at least one upgraded data packet in the data region; and receiving the length of the at least one upgraded data packet, an upgrading indicator, and a restarting time from the main controller; and transmitting a confirmed length of the at least one upgraded data packet, a confirmed upgrading indicator, and a confirmed restarting time to the main controller;

wherein the length of the at least one upgraded data packet, the upgrading indicator, and the restarting time are transmitted via a block control instruction frame;

the confirmed length of the at least one upgraded data packet, the confirmed upgrading indicator, and the confirmed restarting time are transmitted via a block return instruction frame.

18. The node of a robot according to claim 17, wherein the data updating device is further configured for:

receiving a data region erasing request from the main controller, and erasing the data region according to a length of a predetermined data region in response to the data region erasing request;

transmitting a data region erasing response to the main controller, wherein the data region erasing response carries the length of a data region erased;

receiving a length of the at least one upgraded data packet from the main controller, and adjusting the data region erased according to the length of the at least one upgraded data packet.

* * * * *